US009723648B2

(12) United States Patent
Xu

(10) Patent No.: US 9,723,648 B2
(45) Date of Patent: Aug. 1, 2017

(54) NAS CONNECTION ESTABLISHMENT METHOD, SYSTEM AND RADIO ACCESS NETWORK NODE

(71) Applicant: ZTE CORPORATION, Shenzhen, Guangdong Province (CN)

(72) Inventor: Hui Xu, Shenzhen (CN)

(73) Assignee: ZTE Corporation, Shenzhen, Guangdong Province (CN)

( * ) Notice: Subject to any disclaimer, the term of this patent is extended or adjusted under 35 U.S.C. 154(b) by 0 days.

(21) Appl. No.: 15/039,035

(22) PCT Filed: May 20, 2014

(86) PCT No.: PCT/CN2014/077855
§ 371 (c)(1),
(2) Date: May 25, 2016

(87) PCT Pub. No.: WO2014/183685
PCT Pub. Date: Nov. 20, 2014

(65) Prior Publication Data
US 2017/0071025 A1 Mar. 9, 2017

(30) Foreign Application Priority Data

Nov. 29, 2013 (CN) .......................... 2013 1 0628625

(51) Int. Cl.
*H04W 72/00* (2009.01)
*H04W 76/02* (2009.01)
(Continued)

(52) U.S. Cl.
CPC ..... *H04W 76/027* (2013.01); *H04W 28/0289* (2013.01); *H04W 28/16* (2013.01);
(Continued)

(58) Field of Classification Search
None
See application file for complete search history.

(56) References Cited

U.S. PATENT DOCUMENTS

2012/0263036 A1* 10/2012 Barclay ................ H04L 47/245
370/230
2013/0203399 A1* 8/2013 Gupta .................. H04W 28/12
455/418
2013/0301547 A1* 11/2013 Gupta ................. H04W 76/048
370/329

FOREIGN PATENT DOCUMENTS

| CN | 102256218 A | 11/2011 |
| CN | 102395175 A | 3/2012 |
| CN | 102448142 A | 5/2012 |

* cited by examiner

*Primary Examiner* — Erika Washington
(74) *Attorney, Agent, or Firm* — Ling Wu; Stephen Yang; Ling and Yang Intellectual Property

(57) ABSTRACT

Disclosed are an NAS connection establishment method and a radio access network node, the method includes: a radio access network node receiving, from a machine type communication (MTC) user equipment (UE), an Access Stratum (AS) message carrying a non-access stratum (NAS) request message, wherein the AS message carries a request reason of the AS request message; the radio access network node converting the request reason in the AS message into priority indication information and sending a signaling to a core network node, wherein the signaling includes priority indication information and the NAS request message carried in the AS message; the core network node determining the priority of the NAS request message based on the priority indication information in the signaling, and when the core network has a congestion, the core network node sending a rejection response message to a UE that sends an NAS request message with a low priority.

14 Claims, 2 Drawing Sheets

(51) Int. Cl.
  *H04W 28/16* (2009.01)
  *H04W 28/02* (2009.01)
  *H04W 76/04* (2009.01)
  *H04W 4/00* (2009.01)
  *H04W 88/12* (2009.01)
(52) U.S. Cl.
  CPC .......... *H04W 76/046* (2013.01); *H04W 4/005* (2013.01); *H04W 88/12* (2013.01)

NAS CONNECTION ESTABLISHMENT METHOD, SYSTEM AND RADIO ACCESS NETWORK NODE

TECHNICAL FIELD

The present document relates to the machine type communications technology, and more particularly, to an NAS connection establishment method, system and a radio access network node.

BACKGROUND OF THE RELATED ART

Machine-to-machine (M2M) refers to all technologies and means for establishing connections between machines. The concept of M2M appeared in the nineties of $20^{th}$ century, and only stayed in the theoretical stage then. After 2000, with the development of mobile communication technology, the mobile communication technology can be adopted to achieve networking of the machines. In 2002, the M2M service appeared in the market, and has been rapidly developed in the following years, and has become a focus of a large amount of telecommunications equipment manufacturers and telecom operators. Currently, in the worldwide, the number of machines is much more than the number of people, therefore, the M2M technology has good market prospects. Meanwhile, the M2M service has proposed many new requirements on the system, and in order to enhance the competitiveness of the mobile networks in this regard, it needs to optimize the existing mobile networks so as to more effectively support the M2M communication.

The existing mobile communications network is primarily designed for interpersonal communication, and is not optimized enough for the machine-to-machine communication and the man-to-machine communication. If an operator wants to provide the M2M communication service at low cost, it should reuse existing networks to the most extent, and reduce the impact of the M2M communication on networks as well as and the complexity of operation and maintenance.

In order to effectively use the existing mobile network resources, the 3rd Generation Partnership Project (3GPP) proposes services based on machine type communication (MTC), including M2M and machine-to-man communications, its service scope is far beyond the conventional human to human (H2H) communication. The MTC is very different from the existing H2H communication mode in terms of access control, billing, security, quality of service (QoS), and service mode.

The existing 3GPP system architecture comprises: radio access network and core network.

Herein the radio access network may be a Universal Terrestrial Radio Access Network (UTRAN), an Evolved UTRAN (E-UTRAN) or a GSM EDGE Radio Access Network (GERAN).

The core network comprises: Mobility Management Entity (MME), Serving Gateway (S-GW), PDN gateway (P-GW) and other network elements. The General Packet Radio Service (GPRS) core network comprises: Serving GPRS Support Node (SGSN) and other network elements.

The Non Access Stratum (NAS) refers to the control plane high stratum between the User Equipment (UE) and the MME/SGSN, and is located above the Access Stratum (AS). The NAS is mainly responsible for related functions and processes that are not related to the access technologies and are independent of the radio access.

When initiating an NAS connection request, the MTC UE comprises a low priority indication in the NAS request message, the MTC UE first establishes a radio bearer connection with the radio access network, then the UE sends an AS message carrying the NAS request message to the radio access network, and the radio access network forwards the NAS request message to the core network. Because in general the MTC UE is not sensitive to delay, it is considered to be a UE with a low priority. When a network congestion occurs, the network side can reject low-priority requests.

For example, when the radio access network is a UTRAN, the radio access network nodes of the UTRAN comprise Radio Network Controller (RNC) and Node B (NB), the UE sends the AS message carrying the NAS request message to the node B, and the node B forwards the AS message to the RNC, and then the RNC forwards the NAS request message to the SGSN over the Iu interface.

When the radio access network is the E-UTRAN, a radio access network node of the E-UTRAN comprises an evolved Node B (eNB). The UE sends an AS message carrying an NAS request message to the eNB, and the eNB carries the NAS request message in a signaling and sends it to the MME over the S1-MME interface.

In the abovementioned NAS connection establishment method, the radio access network carries the NAS request message in the signaling and sends it to the SGSN/MME, the SGSN/MME needs to read the signaling to obtain the NAS message, and then learns the priority of the NAS request message by reading the content of the NAS message. If a network congestion occurs, the SGSN/MME cannot quickly judge the priority of the NAS request and thus cannot quickly perform an effective control on the network congestion.

SUMMARY

The object of the embodiment of the present document is to provide an NAS connection establishment system and method and a radio access network node to quickly control a network congestion.

To solve the abovementioned technical problem, the following technical solution is used:

An NAS connection establishment method, comprises:

a radio access network node receiving an Access Stratum (AS) message carrying a non-access stratum (NAS) request message from a machine type communication (MTC) user equipment (UE), wherein, the AS message further carries a request reason of the AS request message;

the radio access network node converting the request reason in the AS message into priority indication information, and sending a signaling to a core network node, wherein the signaling comprises the priority indication information and the NAS request message;

the core network node determining a priority of the NAS request message based on the priority indication information in the signaling;

when a congestion occurs in the core network, the core network node sends a rejection response message to a UE that sends an NAS request message with a low priority.

Alternatively, the radio access network node is a radio network controller (RNC) and a Node B, and the core network node is a serving general packet radio service (GPRS) support node (SGSN); or the radio access network node is an evolved Node B, and the core network node is a mobility management entity (MME).

Alternatively, the signaling is a radio access network application protocol (RANAP) signaling sent over an Iu interface or an S1 Application Protocol (S1AP) signaling sent over an S1-M ME interface.

Alternatively, the AS message is a radio resource control (RRC) message.

Alternatively, the priority indication information is saved in a newly-added control field or an originally-reserved control field in the signaling.

Alternatively, the priority indication information is represented with 1 bit or 2 bits.

A radio access network node, comprising a receiving module, a converting module and a sending module, wherein:

the receiving module is configured to: receive an access stratum (AS) message carrying a non-access stratum (NAS) request message from a machine type communication (MTC) user equipment (UE), wherein the AS message further carries a request reason of the AS request message;

the converting module is configured to: convert the request reasons in the AS message into priority indication information;

the sending module is configured to: send a signaling to a core network node, wherein the signaling comprises the priority indication information and the NAS request message.

An NAS connection establishment system comprises a machine type communication (MTC) user equipment (UE), a radio access network node and a core network node, wherein:

the machine type communication (MTC) user equipment (UE) is configured to: send an access stratum (AS) message carrying a non-access stratum (NAS) request message to a radio access network node; wherein the AS message further carries a request reason of the AS request message;

the radio access network node is configured to: receive the AS message from the MTC UE; convert the request reason in the AS message into priority indication information, and send a signaling to the core network node, wherein the signaling comprises the priority indication information and the NAS request message;

the core network node is configured to: determine a priority of the NAS request message based on the priority indication information in the signaling; and when a congestion in the core network is detected, send a rejection response message to a UE that sends an NAS request message with a low priority.

In the NAS connection establishment method, system and a radio access network node in the abovementioned technical solution, after the radio access network node receives an AS message, it converts a request reason in the AS message into priority indication information, and includes the information in a signaling to send together with the NAS request message to the core network node, thus the core network node does not need to read the NAS request message to determine the priority of the NAS request message.

When a congestion occurs in the core network, the core network node does not need to read the NAS request message to respond the NAS request message, so as to quickly control the network congestion.

BRIEF DESCRIPTION OF THE DRAWINGS

Hereinafter, the accompanying drawings in the embodiments of the present document will be described, the accompanying drawings in the embodiments are used to further understand the present document, and serve to explain the present document together with the specification, and are not used for limiting the protection scope of the present document.

PREFERRED EMBODIMENTS

In order to facilitate the understanding of those skilled in the art, in the following, the present document will be further described in conjunction with the accompanying drawings, and the accompanying drawings can not be used to limit the protection scope of the present document.

Figure 1:
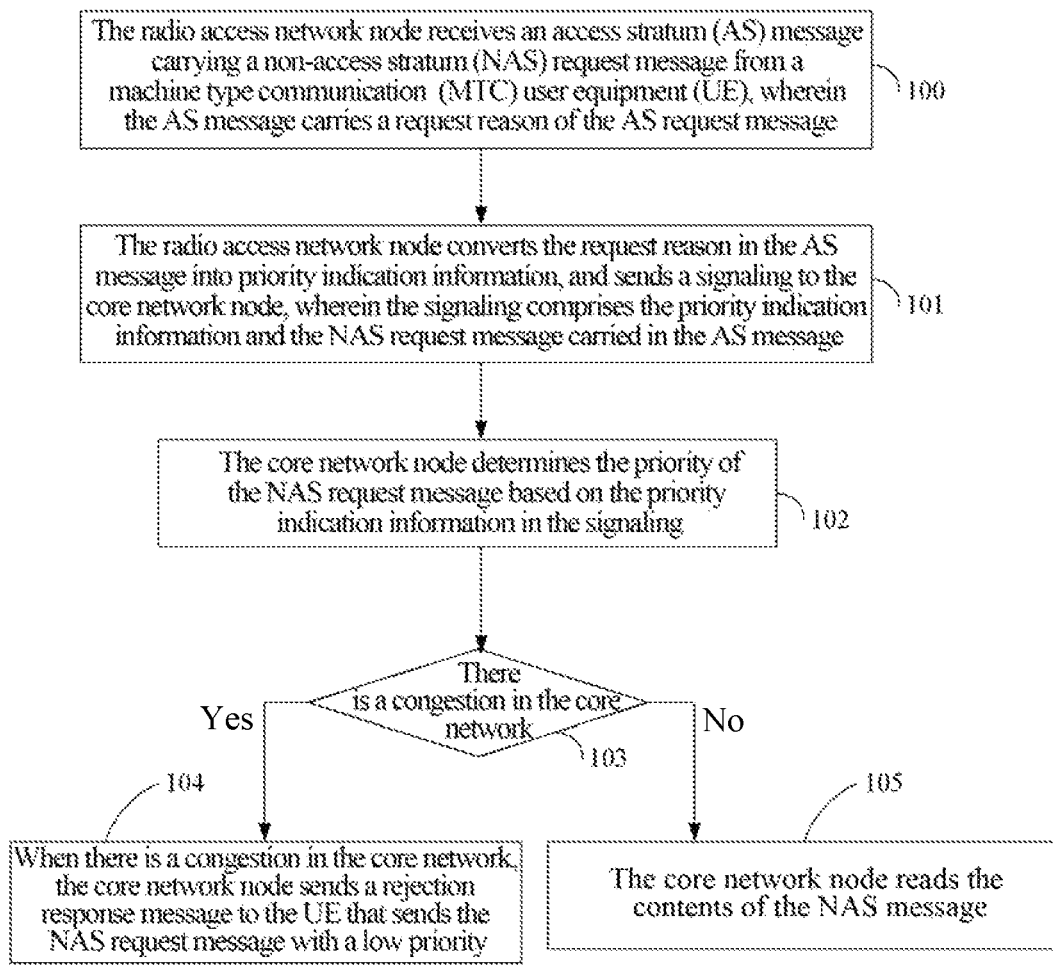
FIG. 1 is a flow chart of an NAS connection establishment method in accordance with an embodiment of the present document.

Refer to FIG. 1, the embodiment of the present document provides a priority indication method, the method comprises:

in step 100, the radio access network node receives an AS message carrying an NAS request message from a communications machine type (MTC) user equipment (UE), the AS message carries a request reason of the AS request message.

In the present step, when the UE sends an NAS connection request to the core network, it needs the radio access network node to forward the message, while the radio access network node can only receive the AS message, therefore, the AS message sent by the UE to the radio access network node carries the NAS request message sent to the core network, and also comprises the request reason of the AS request message. The request reason of the AS request message may be Mobile Originated (MO) signaling, MO data, Mobile Terminating (MT) access, emergency call, or delay tolerant access, and so on, herein the delay tolerant access represents that the UE sending the AS request message is a UE with a low priority, such as MTC UE; the NAS request message sent by the UE with a low priority also has a low priority, a low priority indication bit of the low-priority NAS request message is located in the NAS request message, the NAS request message is transparent to the access network node, namely, the access network node would not read contents of the NAS request message, therefore the access network node does not know the contents of the NAS request message.

In this step, the NAS request message may be an attachment message, a service request message, a Track Area Update (TAU)/Route Area Update (RAU) request message, which is not limited in the present document.

In this step, the UE sends the AS message to the radio access network node via an air interface.

In this step, the AS message is a radio resource control (RRC) message.

In this step, for the UTRAN, the radio access network node is the RNC and the NB; for the E-UTRAN, the radio access network node is an eNB.

In step 101, the radio access network node converts the request reason in the AS message into priority indication information, and sends a signaling to the core network node, the signaling comprises the priority indication information and the NAS request message carried in the AS message.

In this step, when the radio access network node is the RNC and the NB, the RNC sends a Radio Access Network Application Protocol (RANAP) signaling to the SGSN over the Iu interface; when the radio access network node is the eNB, the eNB sends an S1 application protocol (S1AP) signaling to the MME over the S1-MME interface.

In this step, when the request reason is delay tolerance, it represents that the UE sending the AS message is a UE with a low priority, so that it can be judged that the NAS request message carried in the AS message has a low priority. After receiving the AS message, the radio access network node converts the request reason of delay tolerance to low-priority indication information and sends the information to the core network node.

In this step, the signaling comprising the priority indication information and the NAS request message carried in the AS message specifically refers to: respectively saving the priority indication information and the NAS request message carried in the AS message into separate control fields of the signaling, herein, the control field where the priority indication information is located may be a newly-added control field or an originally-reserved control field, when there is no control field containing the priority indication information, it defaults to a non-low priority. In this step, one bit can be used to represent the priority indication information, when the bit is 0, it represents a non-low priority, when the bit is 1, it represents a low priority; or 2 bits also be used to represent the priority indication information, for example, when the bits are 00, it represents a low priority, when the bits are 11, it represents a high priority, and 01 or 10 represents a normal priority, and so on.

In step 102, the core network node determines the priority of the NAS request message based on the priority indication information in the signaling. In step 103, it is to judge whether there is a congestion in the core network, and if yes, the process proceeds to step 104, otherwise, it proceeds to step 105.

The core network node judges whether there is a congestion in the core network based on the local indication information, and if there is a congestion, the NAS request message with a low priority is rejected, otherwise the contents of the NAS message are read. The specific judgment method belongs to the related art and will not be repeated here.

In step 104, when there is a congestion in the core network, the core network node sends a rejection response message to the UE that sends the NAS request message with a low priority.

In this step, the rejection response message may comprise a backward time, which represents that the core network only processes the NAS request message after the backward time.

In step 105, the core network node reads the contents of the NAS message.

In the NAS connection establishment method provided in the present document, after the radio access network node receives the AS message, it converts the request reason in the AS message into priority indication information, and includes the information in the signaling to send together with the NAS request message to the core network node, thus the core network node does not need to read the NAS request message to determine the priority of the NAS request message. When a congestion occurs in the core network, the core network node does not need to read the NAS request message to respond to the NAS request message, so as to quickly control the network congestion.

Figure 2:
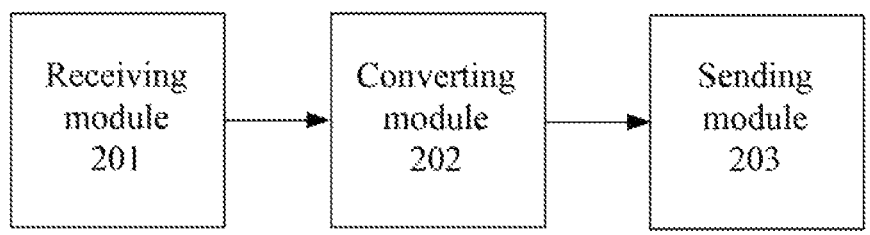
FIG. 2 is a schematic diagram of the composition structure of a radio access network node in accordance with an embodiment of the present document.

Refer to FIG. 2, the embodiment of the present document further provides a radio access network node, comprising at least receiving module 201, converting module 202 and sending module 203, herein:

the receiving module 201 is configured to: receive an access stratum (AS) message carrying a non-access stratum (NAS) request message from a machine type communication (MTC) user equipment (UE), the AS message further carries a request reason;

the converting module 202 is configured to: convert the request reason in the AS message into priority indication information;

the sending module 203 is configured to: send a signaling to a core network node, the signaling comprises the priority indication information and the NAS request message carried in the AS message.

Figure 3:
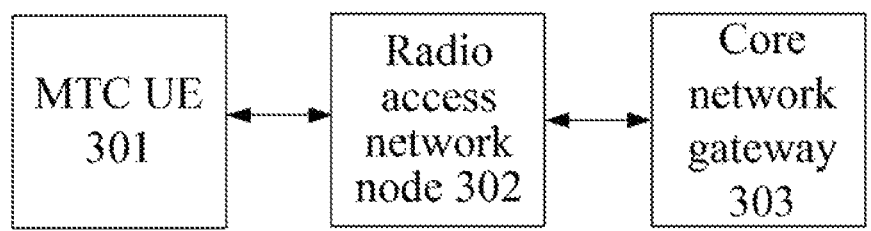
FIG. 3 is a schematic diagram of the composition structure of an NAS connection establishment system in accordance with an embodiment of the present document.

Refer to FIG. 3, the present document further provides an NAS connection establishment system, comprising at least machine type communication (MTC) user equipment (UE) 301, radio access network node 302 and core network node 303, herein:

the machine type communication (MTC) user equipment (UE) 301 is configured to: send an access stratum (AS) message carrying a non-access stratum (NAS) request message to a radio access network node; the AS message carries the request reason in the AS request message;

the radio access network node 302 is configured to: receive the AS message from the UE; convert the request reason in the AS message into priority indication information, and send a signaling to the core network node, the signaling comprises the priority indication information and the NAS request message carried in the AS message;

the core network node 303 is configured to: determine the priority of the NAS request message based on the priority indication information in the signaling; and when a congestion in the core network is detected, send a rejection response message to the UE that sends an NAS request message with a low priority.

It should be noted that the embodiments described above are merely easy for those skilled in the art to understand, and are not intended to limit the protection scope of the present document, and under the premise of without departing from the inventive concept of the present document, any apparent replacements and improvements made on the present document by those skilled in the art should be within the protection scope of the present document.

INDUSTRIAL APPLICABILITY

In the NAS connection establishment method, system and the radio access network node in the abovementioned technical solution, after the radio access network node receives an AS message, it converts a request reason in the AS message into priority indication information, and includes the information in a signaling to send together with the NAS request message to the core network node, thus the core network node does not need to read the NAS request message to determine the priority of the NAS request message. When a congestion occurs in the core network, the core network node does not need to read the NAS request message to respond the NAS request message, so as to quickly control the network congestion. Therefore, the present document has very strong industrial applicability.

What is claimed is:
1. A non-access stratum (NAS) connection establishment method, comprising:
a radio access network node receiving an Access Stratum (AS) message carrying a non-access stratum (NAS) request message from a machine type communication

(MTC) user equipment (UE), wherein, the AS message further carries a request reason of the AS request message;

the radio access network node converting the request reason in the AS message into priority indication information, and sending a signaling to a core network node, wherein the signaling comprises the priority indication information and the NAS request message;

the core network node determining a priority of the NAS request message based on the priority indication information in the signaling;

when a congestion occurs in the core network, the core network node sends a rejection response message to a UE that sends an NAS request message with a low priority.

2. The method of claim 1, wherein,
the radio access network node is a radio network controller (RNC) and a Node B, and the core network node is a serving general packet radio service (GPRS) support node (SGSN); or the radio access network node is an evolved Node B, and the core network node is a mobility management entity (MME).

3. The method of claim 2, wherein, the signaling is a radio access network application protocol (RANAP) signaling sent over an Iu interface or an S1 Application Protocol (S1AP) signaling sent over an S1-MME interface.

4. The method of claim 1, wherein, the AS message is a radio resource control (RRC) message.

5. The method of claim 1, wherein, the priority indication information is saved in a newly-added control field or an originally-reserved control field in the signaling.

6. The method of claim 1, wherein, the priority indication information is represented with 1 bit or 2 bits.

7. The method of claim 1, wherein the request reason in the AS message comprises delay tolerance which represents that the UE sending the AS message is a UE with a low priority.

8. The method of claim 7, wherein after receiving the AS message, the radio access network node converts the request reason of the delay tolerance to low-priority indication information and sends the low-priority indication information to the core network node.

9. A radio access network node, comprising a receiving module, a converting module and a sending module, wherein:

the receiving module is configured to: receive an access stratum (AS) message carrying a non-access stratum (NAS) request message from a machine type communication (MTC) user equipment (UE), wherein the AS message further carries a request reason of the AS request message;

the converting module is configured to: convert the request reasons in the AS message into priority indication information;

the sending module is configured to: send a signaling to a core network node, wherein the signaling comprises the priority indication information and the NAS request message.

10. The radio access network node of claim 9, wherein the request reason in the AS message comprises delay tolerance which represents that the UE sending the AS message is a UE with a low priority.

11. The radio access network node of claim 10, wherein after receiving the AS message, the radio access network node converts the request reason of the delay tolerance to low-priority indication information and sends the low-priority indication information to the core network node.

12. An NAS connection establishment system, comprising a machine type communication (MTC) user equipment (UE), a radio access network node and a core network node, wherein:

the machine type communication (MTC) user equipment (UE) is configured to: send an access stratum (AS) message carrying a non-access stratum (NAS) request message to a radio access network node; wherein the AS message further carries a request reason of the AS request message;

the radio access network node is configured to: receive the AS message from the MTC UE; convert the request reason in the AS message into priority indication information, and send a signaling to the core network node, wherein the signaling comprises the priority indication information and the NAS request message;

the core network node is configured to: determine a priority of the NAS request message based on the priority indication information in the signaling; and when a congestion in the core network is detected, send a rejection response message to a UE that sends an NAS request message with a low priority.

13. The NAS connection establishment system of claim 12, wherein the request reason in the AS message comprises delay tolerance which represents that the UE sending the AS message is a UE with a low priority.

14. The NAS connection establishment system of claim 13, wherein after receiving the AS message, the radio access network node converts the request reason of the delay tolerance to low-priority indication information and sends the low-priority indication information to the core network node.

* * * * *